(12) United States Patent
Lin et al.

(10) Patent No.: US 10,776,671 B2
(45) Date of Patent: Sep. 15, 2020

(54) JOINT BLUR MAP ESTIMATION AND BLUR DESIRABILITY CLASSIFICATION FROM AN IMAGE

(71) Applicant: Adobe Inc., San Jose, CA (US)

(72) Inventors: Zhe Lin, Fremont, CA (US); Xiaohui Shen, San Jose, CA (US); Shanghang Zhang, Lisbon (PT); Radomir Mech, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 349 days.

(21) Appl. No.: 15/989,436

(22) Filed: May 25, 2018

(65) Prior Publication Data

US 2019/0362199 A1   Nov. 28, 2019

(51) Int. Cl.
| | |
|---|---|
| *G06K 9/62* | (2006.01) |
| *G06K 9/46* | (2006.01) |
| *G06T 7/00* | (2017.01) |
| *G06N 3/08* | (2006.01) |

(52) U.S. Cl.
CPC ......... *G06K 9/6289* (2013.01); *G06K 9/4671* (2013.01); *G06K 9/6267* (2013.01); *G06N 3/08* (2013.01); *G06T 7/0002* (2013.01); *G06T 2207/20081* (2013.01); *G06T 2207/20084* (2013.01); *G06T 2207/20212* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 2004/0263511 A1* | 12/2004 | West | ...................... | G06T 15/40 345/421 |
| 2013/0071028 A1* | 3/2013 | Schiller | ..................... | G06T 7/11 382/180 |
| 2013/0129233 A1* | 5/2013 | Schiller | ................... | G06T 11/60 382/228 |
| 2015/0055824 A1* | 2/2015 | Hong | ................... | G06K 9/4652 382/103 |
| 2015/0248745 A1* | 9/2015 | Chen | ...................... | G06T 7/593 382/154 |
| 2016/0014328 A1* | 1/2016 | Rokutanda | ......... | H04N 5/23212 348/65 |

(Continued)

OTHER PUBLICATIONS

Park, J. et al., "A Unified Approach of Multi-scale Deep and Hand-crafted Features for Defocus Estimation", CVPR, 2017, pp. 1736-1745.

(Continued)

*Primary Examiner* — Kevin Ky
(74) *Attorney, Agent, or Firm* — Finch & Maloney PLLC

(57) ABSTRACT

Techniques are disclosed for blur classification. The techniques utilize an image content feature map, a blur map, and an attention map, thereby combining low-level blur estimation with a high-level understanding of important image content in order to perform blur classification. The techniques allow for programmatically determining if blur exists in an image, and determining what type of blur it is (e.g., high blur, low blur, middle or neutral blur, or no blur). According to one example embodiment, if blur is detected, an estimate of spatially-varying blur amounts is performed and blur desirability is categorized in terms of image quality.

20 Claims, 15 Drawing Sheets

(56) References Cited

U.S. PATENT DOCUMENTS

| | | | | |
|---|---|---|---|---|
| 2016/0104291 | A1* | 4/2016 | Zhou | G06T 7/194 |
| | | | | 382/173 |
| 2017/0206415 | A1* | 7/2017 | Redden | H04N 13/128 |
| 2017/0352143 | A1* | 12/2017 | Kompalli | G06T 7/0002 |
| 2018/0089839 | A1* | 3/2018 | Li | G06K 9/6267 |
| 2018/0211128 | A1* | 7/2018 | Hotson | G01S 13/867 |
| 2018/0350043 | A1* | 12/2018 | Seely | G06T 5/50 |
| 2019/0042888 | A1* | 2/2019 | Tsutsui | G06T 7/11 |
| 2019/0197362 | A1* | 6/2019 | Campanella | G06K 9/4642 |

OTHER PUBLICATIONS

Yu, N. et al., "Learning to Detect Multiple Photographic Defects", arXiv:1612.01635v5, Mar. 8, 2018, 10 pages.

Agrawal, A. et al., "Optimal single image capture for motion deblurring", IEEE, 2009, pp. 2560-2567.

Bae, S. and F. Durand, "Defocus Magnification", Eurographics, 2007, vol. 26, 9 pages.

Chakrabarti, A. et al., "Analyzing Spatially-varying Blur", Proc. of the IEEE Computer Society Conference on Computer Vision and Pattern Recognition (CVPR), 2010, 8 pages.

Chen, J. et al., "Robust Dual Motion Deblurring", IEEE, 2008, 8 pages.

Chen, L.C. et al., "Semantic image segmentation with deep convolutional nets, atrous convolution, and fully connected crfs", arXiv:1606.00915v2, May 12, 2016, 14 pages.

Du, J. et al., "Topology Adaptive Graph Convolutional Networks", arXiv:1710.10370v5, Feb. 11, 2018, 13 pages.

Girshick, R. et al., "Rich feature hierarchies for accurate object detection and semantic segmentation", In Proceedings of the IEEE conference on computer vision and pattern recognition, 2014, pp. 580-587.

Golestaneh, S.A. et al., "Spatially-Varying Blur Detection Based on Multiscale Fused and Sorted Transform Coefficients of Gradient Magnitudes", CVPR, 2017, pp. 5800-5809.

He, K. et al., "Deep Residual Learning for Image Recognition", arXiv:1512.03385v1, Dec. 10, 2015, 12 pages.

Ioffe, S. et al., "Batch Normalization: Accelerating Deep Network Training by Reducing Internal Covariate Shift", Proceedings of the 32nd International Conference on Machine Learning, 2015, vol. 37, 9 pages.

Joshi, N. et al., "Image Deblurring using Inertial Measurement Sensors", AMC SIGGRAPH conference proceedings, 2010, 8 pages.

Joshi, N. et al., "PSF Estimation using Sharp Edge Prediction", CVPR, 2008, 8 pages.

Kinga, D. and J.L. Ba, "ADAM: A Method for Stochastic Optimization", arXiv:1412.6980v9, Jan. 30, 2017, 15 pages.

Kikkinos, I., "Pushing the Boundaries of Boundary Detection Using Deep Learning", Published as a conference paper at ICLR 2016, 12 pages.

Lee, Y.J. et al., "Discovering Important People and Objects for Egocentric Video Summarization", CVPR, 2012, 8 pages.

Liu, R. et al., "Image Partial Blur Detection and Classication", IEEE, 2008, 8 pages.

Mai, L. and F. Liu, "Kernel Fusion for Better Image Deblurring", IEEE, 2015, 10 pages.

Mavridaki, E. and V. Mezaris, "No-Reference Blur Assessment in Natural Images Using Fourier Transform and Spatial Pyramids", Proc. IEEE International Conference on Image Processing, Oct. 2014, pp. 566-570.

Mendleson, A.L. and Z. Papacharissi, "Look at us: Collective Narcissism in College Student Facebook Photo Galleries", The Networked Self: Identity, Community and Culture on Social Network Sites, 2010, 37 pages.

Shan, Q. et al., "High-quality Motion Deblurring from a Single Image", AMC Transqctions on Graphics, Aug. 2008, vol. 27, 10 pages.

Shi, J. et al., "Discriminative Blur Detection Features", AMC Transaction on Graphics, 2014, 8 pages.

Shi, J. et al., "Just Noticeable Blur Detection and Estimation Supplementary Material", IEEE, 2016, 10 pages.

Simonyan K. and A. Zisserman, "Very Deep Convolutional Networks for Large-Scale Image Recognition", ARxIV:1409.1556V6, Apr. 10, 2015, 14 pages.

Su, B. et al., "Blurred Image Region Detection and Classification", In Proceedings of the 19th ACM international conference on Multimedia, 2011, 4 pages.

Suwanjanakorn, S. et al., "Depth from Focus with Your Mobile Phone", CVPR, 2015, pp. 3497-3506.

Szegedy, C. et al., "Rethinking the Inception Architecture for Computer Vision", arXiv:1512.00567v1. Dec. 2, 2015, 10 pages.

Tang, C. et al., "Defocus map estimation from a single image via spectrum contrast", Optic Letters, May 15, 2013, vol. 38, pp. 1706-1708.

Tang, C. et al., "A Spectral and Spatial Approach of Coarse-to-Fine Blurred Image Region Detection", IEEE Signal Processing Letters, 2016, vol. 23, p. 1652-1656.

Wang, Y. et al., "Recognizing and Curating Photo Albums via Event-Specific Image Importance", arXiv:1707.05911, 2017, 13 pages.

Xu, L. and J Jia, "Two-Phase Kernel Estimation for Robust Motion Deblurring", European Conference on Computer Vision, 2010, pp. 157-170.

Yi, X and M. Eramian, "LBP-based Segmentation of Defocus Blur", IEEE Transactions on Image Processing, 2016, 13 pages.

Zhang, J. et al., "Minimum barrier salient object detection at 80 fps", In Proceedings of the IEEE International Conference on Computer Vision, 2015, pp. 1404-1412.

Zhao, H. et al., "Pyramid Scene Parsing Network", arXiv:1612.011502v2, Apr. 27, 2017, 11 pages.

Zhong, L. et al., "Handling Noise in Single Image Deblurring using Directional Filters", CVRP, 2013, 8 pages.

Zhou, S. and T. Sim, "Defocus map estimation from a single image", Pattern Recognition, 2011, vol. 44, pp. 1852-1858.

* cited by examiner

|  | Bad-Blur | Ok-Blur | Good-Blur | No-Blur | Total |
|---|---|---|---|---|---|
| Training | 1568 | 1583 | 3777 | 1422 | 8400 |
| Validation | 200 | 200 | 200 | 200 | 800 |
| Testing | 200 | 200 | 200 | 200 | 800 |
| Total | 1968 | 1983 | 4177 | 1822 | 10,000 |

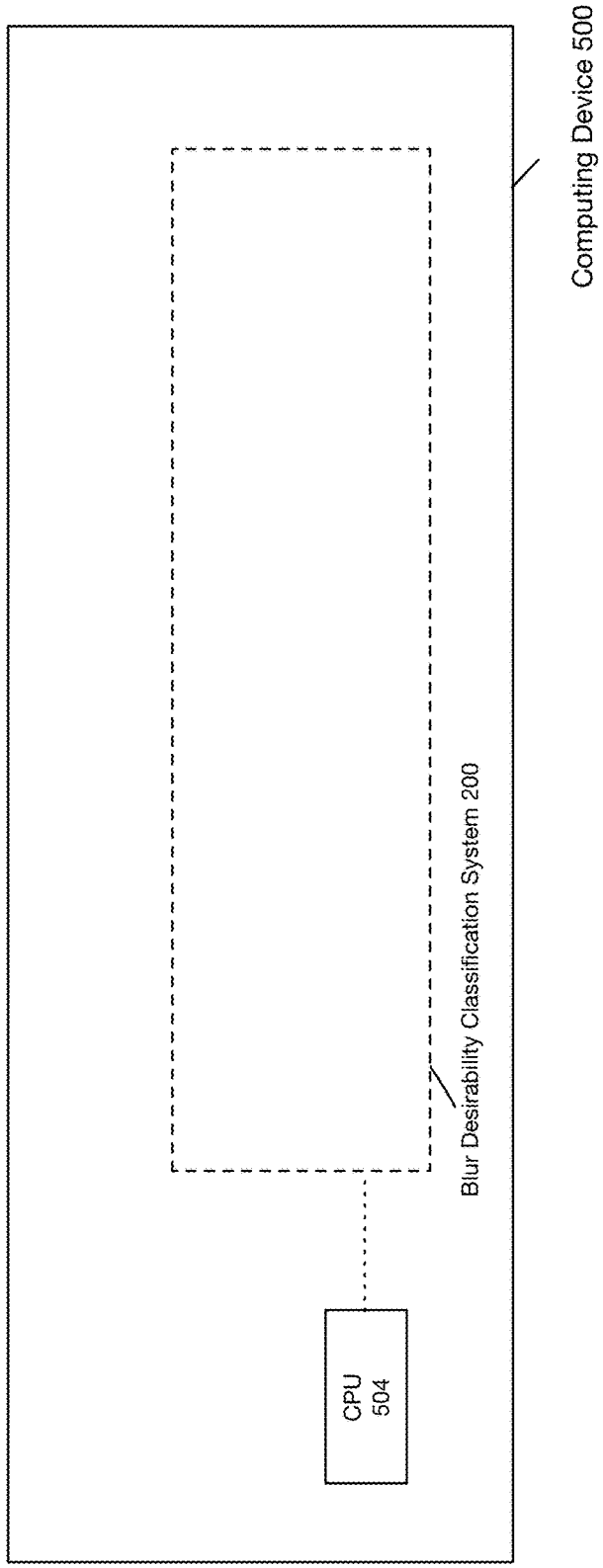

_US 10,776,671 B2_

JOINT BLUR MAP ESTIMATION AND BLUR DESIRABILITY CLASSIFICATION FROM AN IMAGE

FIELD OF THE DISCLOSURE

This disclosure relates to machine learning and deep learning, particularly in the context of performing blur classification of an image.

BACKGROUND

Digital photography has become ubiquitous. Image blur is very common in natural photos, arising from different factors such as object motion, camera lens out-of-focus issues, and camera shake. In many cases, blur is undesired when important regions are affected and become less sharp. However, in other cases, blur may actually be desired, for example, when the background is blurred to make the subject pop out, or motion blur is added to give the photo an artistic look.

Many research efforts have focused on detection of undesired blur, its removal or direct estimation of desired blur, and its enhancement. However, there have been no or otherwise unknown efforts to develop an algorithm to programmatically understand whether blur is desired or not in the first place. Classifying blur as desirable or undesirable would be very useful, for instance, to help users categorize photos and make corresponding edits, especially with the dramatic growth in the number of personal photos. Blur analysis can also be used to estimate photo quality, as well as be applied in photo curation, photo collage creation, and video summarization.

As previously noted, images may have areas of blurriness due to various factors, with some occurrences of blur being desirable and others undesirable. For example, two photos may utilize a depth-of-field effect. One photo may be regarded as good or acceptable while the other may be considered bad or unacceptable due to the particular elements of content that are blurry. Similarly, a photo may be considered of in-between quality depending upon which content in the image is blurry and the particularities of the blurriness. For example, a photo of a tennis player may be considered of poor quality if the intended or agreed-upon subject is blurry. As an additional example, a photo with a shallow depth-of-field effect can be desirable if the subject is highlighted in the background. However, it can be undesirable if the main subject is out of focus (i.e., the main subject is blurry).

Thus, whether blur is desirable or undesirable depends on the content that is blurred in context with the rest of the photograph. It is desirable to evaluate the blur characteristics inherent in particular images in automated programmatic fashion so that digital photographs may be categorized. However, performing blur desirability classification is not trivial. For instance, successfully performing blur classification requires not only accurate spatially varying blur amount estimation but also an understanding whether the blurry regions are important from the perspective of image content and the photographer's intent (e.g., an image having blur in the face of a tennis player that has just struck a tennis ball will likely be undesirable, while blur of the struck ball captured in that same image may actually be desired).

BRIEF DESCRIPTION OF THE DRAWINGS

FIG. 5a illustrates an example computing system that executes blur desirability classification system, according to one embodiment of the present disclosure.

DETAILED DESCRIPTION

Figure 1:
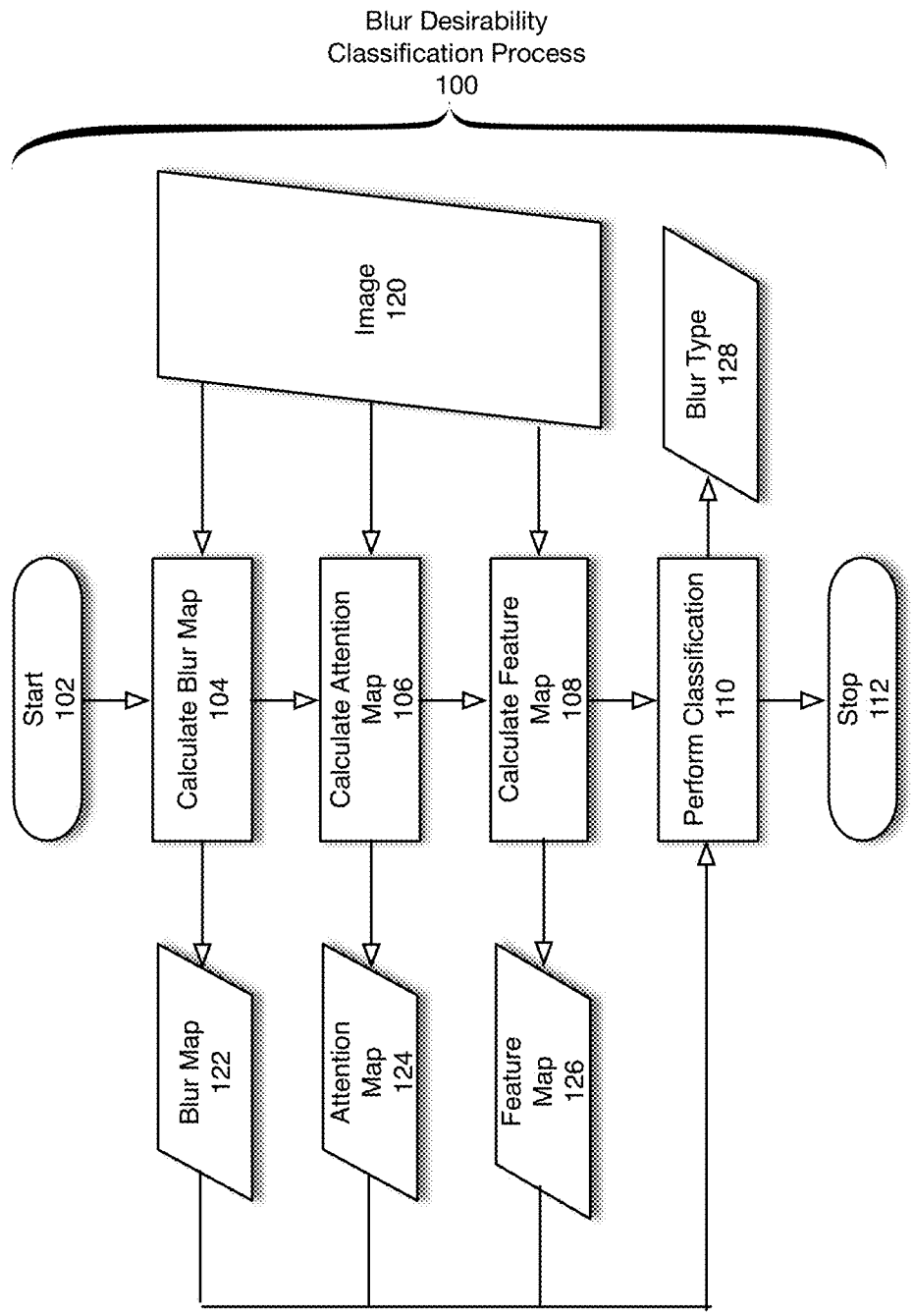
FIG. 1 is a flow chart of a blur desirability classification process according to one embodiment of the present disclosure.

Blur desirability classification techniques are disclosed herein, wherein image content is utilized to guide blur analysis. In particular, the techniques effectively combine low-level blur estimation with a high-level understanding of important image content in order to perform blur classification. To this end, the techniques allow for programmatically determining if blur exists in an image, and whether or not that blur is desirable. According to one embodiment, if blur is detected, an estimate of spatially-varying blur amounts detected in the given image is performed. In some such embodiments, blur desirability is categorized in terms of image quality using four levels: GoodBlur, OkBlur, BadBlur, and NoBlur. However, any number of other such classification schemes may be employed, as will be appreciated in light of this disclosure.

According to one embodiment of the present disclosure, a deep neural network architecture herein referred to as ABC-FuseNet performs blur classification. ABC-FuseNet learns an attention map ($A_m$), blur map ($B_m$), and content feature map ($C_m$), and fuses these maps together into a composite map, which is provided to a classifier to detect if there is blur in important content such that blur desirability may be estimated. The content feature map indicates features captured in the image, the attention map indicates which of those features are important or salient, and the blur map indicates blur locations captured in the image. According to one such embodiment, the entire network is end-to-end jointly trained on both pixel-wise blur map estimation and image-level blur categorization. In some such cases, a pixel-wise blur map estimation is performed using a dilated fully convolutional network ("FCN") with a designed global pyramid pooling mechanism. The local and global cues provided via the dilated convolution provide for more accurate and reliable blur map estimation in homogeneous regions and also provides for invariance with respect to multiple object scales.

The blur desirability classification may be performed by determining specific content within an image and then performing the blur classification with respect to that content. For example, in a scene involving significant motion such as an automobile race, blur may be a natural aspect of the image and therefore such blur would not typically be considered undesirable. Numerous other blur scenarios including desirable and/or undesirable blur will be appreciated in light of this disclosure.

According to still another embodiment of the present disclosure, a dataset herein referred to as SmartBlur is generated that provides supervised training data via both pixel-level blur amount annotation and image level blur category supervision. The dataset can be used to train a classifier to categorize blur in a given image as, for example, good blur, bad blur, ok (neutral) blur, or no blur.

Blur classification as provided herein has a multitude of technical advantages. In particular, it goes beyond merely classifying images as having blur, and allows for a programmatic and accurate determination of the desirability or undesirability of blur in a given image. This is achieved by taking into account not only occurrences of blur in the image (via a blur map), but also content features captured in the image (via a content map) as well as which of those content features are important or salient (via an attention map). By combining the blur map, content feature map, and attention map to generate a composite map, a smart blur classification (e.g., good blur, bad blur, neutral blur, or no blur) can be made that is effectively both content-aware and context-aware, at least to some extent. Such classification provides numerous benefits in the automatic analysis of images so that, for example, they can either be accepted or rejected as desirable or undesirable images, based not only on the occurrence of blur but on the type of blur and how that blur impacts the image.

Blur Classification Processing

Figure 2A:
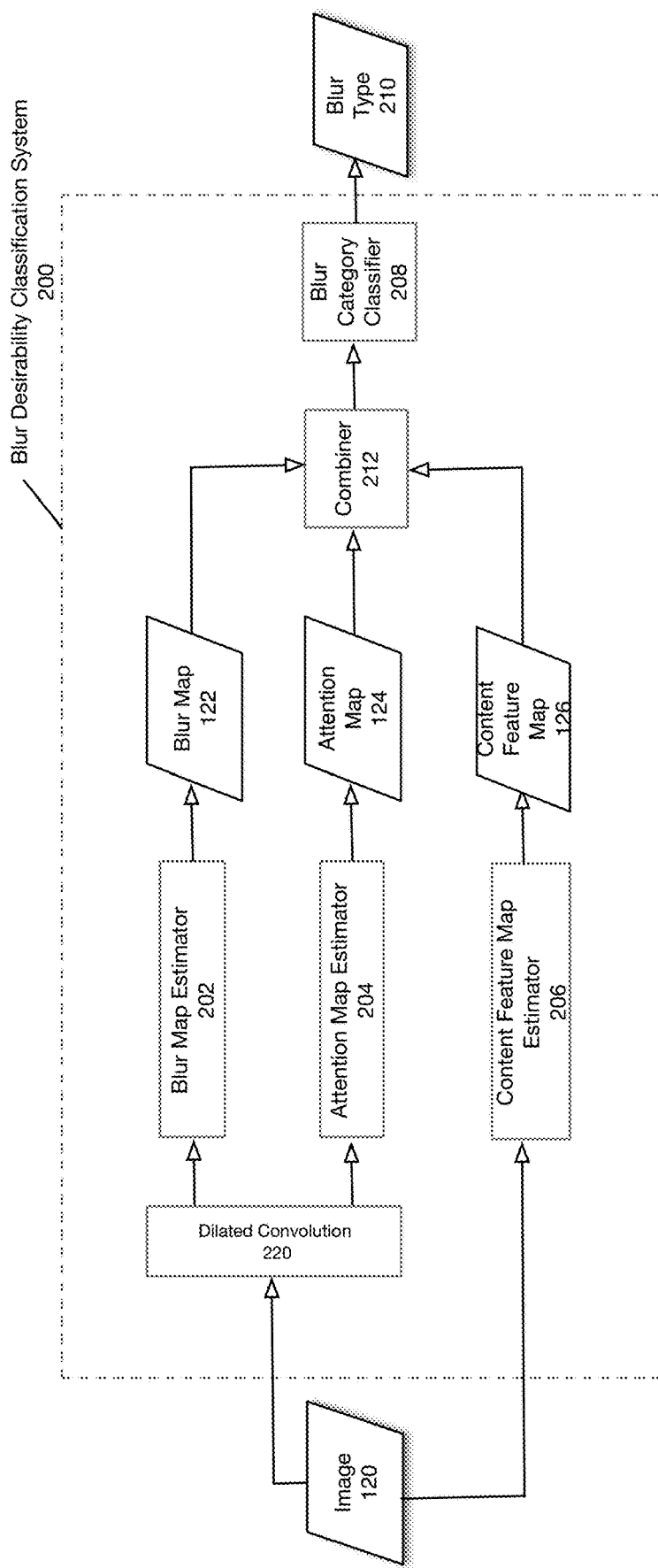
FIG. 2a is a block diagram of a blur desirability classification system according to one embodiment of the present disclosure.

FIG. 1 is a flow chart of a blur desirability classification process according to one embodiment of the present disclosure. The process shown in FIG. 1 may be performed by a blur desirability classification system, such as shown in FIG. 2a or 2d. Note the order of the various processes or functions performed may be different than the order in which they are presented in the example process flow. As will be described in more detail below, according to one embodiment of the present disclosure, a blur classification system is a deep neural network herein referred to as ABC-FuseNet. As can be seen, the process is initiated in 102. In 104, blur map 122 is generated from given input image 120, to highlight blur locations captured in image 120. In 106, attention map 124 is generated from image 120, to highlight important or salient feature captured in image 120. In 108, content feature map 126 is generated from image 120, to highlight the various features captured in image 120. Blur map 122, attention map 124 and content feature map 126 are collectively subjected to classification at 110, thereby generating blur type 128. The process ends in 112.

It will be further appreciated that blur map 122, attention map 124 and content feature map 126 may each respectively comprise a tensor of some dimension. In the context of machine learning and deep neural networks, a tensor may be understood as an array of arbitrary dimension.

Blur Classification System

FIG. 2a is a block diagram of a blur desirability classification system according to one embodiment of the present disclosure. As previously described, according to one specific embodiment, a deep neural network referred to as ABC-FuseNet is utilized as a blur classification system. As shown in FIG. 2a, blur desirability classification system 200 comprises dilated convolution block 220, blur map estimator 202, attention map estimator 204, content feature map estimator 206, combiner 212, and blur type (or blur category) classifier 208. As shown in FIG. 2a, image 120, which may be a digital image file, is received by both dilated convolution block 220 and content feature map estimator 206. The output of dilated convolution block 220 is provide to both attention map estimator 204 and blur map estimator 202, which respectively generate attention map 124 and blur map 122. Meanwhile image 120 is processed by content feature map estimator 206 to generate content feature map 126. Blur map 122, attention map 124 and content feature map 126 are combined by combiner 212 (e.g., by performing concatenation or other combinatorial operations). The output of combiner 212, which effectively comprises a composite of blur map 122, attention map 124, and content feature map 126, is provided to blur type classifier 208, which in turn generates blur type prediction 210.

Blur Map Estimator

Figure 2B:
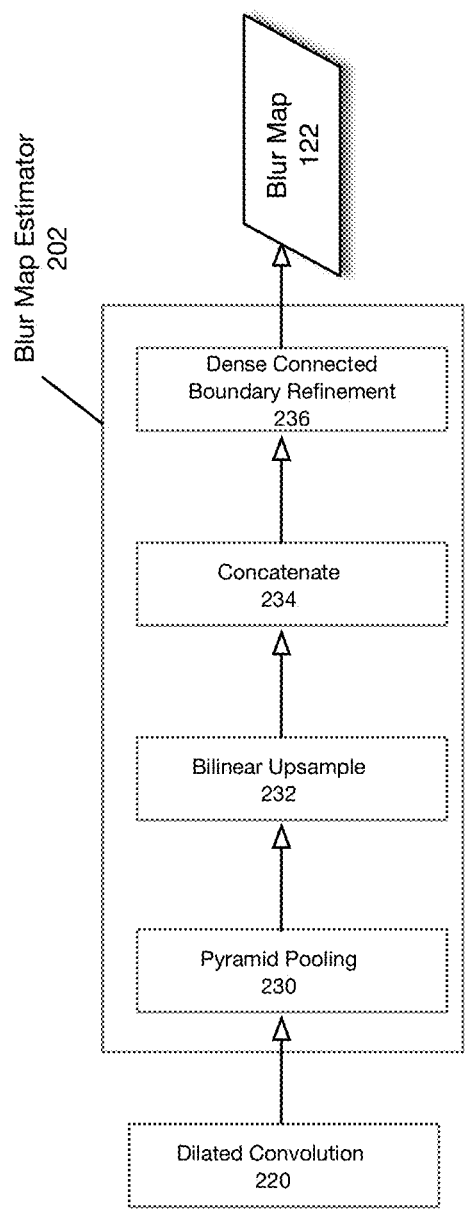
FIG. 2b is a detailed block diagram of a blur map estimator according to one embodiment of the present disclosure.

FIG. 2b is a detailed block diagram of a blur map estimator according to one embodiment of the present disclosure. According to one specific embodiment, blur map estimator 202 is based upon the deep neural network ("DNN") model Inception-V2. However, because Inception-V2 was designed for image classification, various modifications of the Inception-V2 model are introduced to adapt to the problem of performing blur map estimation, in accordance with an embodiment of the present disclosure.

Detecting blur is challenging for at least two reasons. First, it is difficult to detect blurs in small regions because the feature map resolution is reduced by the repeated combination of max-pooling and down-sampling (striding) performed at consecutive layers in the convolutional neural network ("CNN"), which is typically designed for image classification. In order to address this issue, according to one embodiment of the present disclosure, and to effectively enlarge the receptive fields without sacrificing significant spatial resolutions, the down-sampling operator of the Inception-V2 model is removed and the standard convolution operation in Inception-V2 is replaced with a dilated convolution operator.

In addition, according to one such embodiment, high-level semantic features are combined with low-level features after a first convolution layer in order to maintain spatial resolution and perform better blur estimation in small regions. In particular, according to one such embodiment, high-level features are up-sampled using an interpolation scheme such as bilinear interpolation. The up-sampled features are then concatenated with the low-level features along the channel dimension. To further obtain better blur region boundaries, several boundary refinement layers with dense connections are appended after up-sampling.

The second challenge with respect to detecting blur is to accurately detect blurs in multiple scale objects and in homogeneous regions, which show almost no difference in appearance when they are sharp or blurred. A standard technique to address the challenge of variable scales is to re-scale the CNN for the same image and then aggregate the feature or score maps, which significantly increases computation cost. Instead, according to one embodiment of the present disclosure, a pyramid pooling module is introduced to combine the local and global clues together to facilitate a more reliable final blur detection in the homogeneous regions, which is also invariant to multiple object scales. This technique provides hierarchical global prior, containing information with different scales and varying among different sub-regions. In particular, according to one such embodiment, four-level features from Inception_5b are pooled:

1×1
2×2
3×3
6×6

To maintain the weight of global feature, a 1×1 convolution layer is introduced after each pyramid level to reduce the dimension of context representation to ¼ of the original one. Then each pooled feature map is up-sampled to be the same size as Inception_5b and concatenated together as a final pyramid pooling feature.

The architecture shown in FIG. 2b incorporates the aforementioned modifications to address the blur map estimation problem. In particular, as shown in FIG. 2b, blur map estimator 202 comprises pyramid pooling block 230, bilinear up-sample block 232, concatenate block 234, and dense connected boundary refinement block 236. The output of dilated convolution block 220 is provided to pyramid pooling block 230, which generates an output that is provided to bilinear up-sample block 232. The output of bilinear up-sample block 232 is provided to concatenate block 234, which generates an output that is provided to dense connected boundary refinement block 236. Dense connected boundary refinement block 236 then generates blur map 122 as output.

Figure 2C:
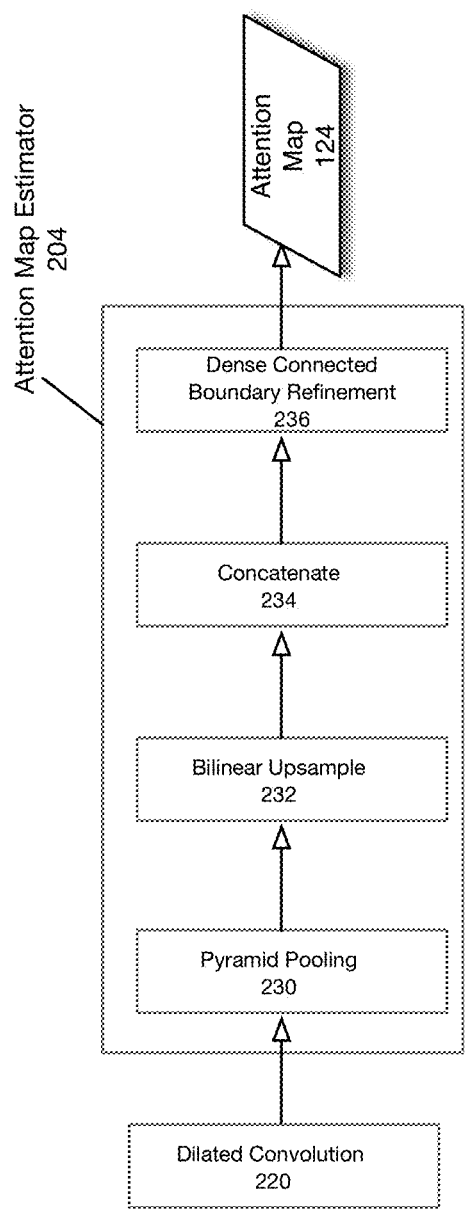
FIG. 2c is a detailed block diagram of an attention map estimator according to one embodiment of the present disclosure.
Figure 2D:
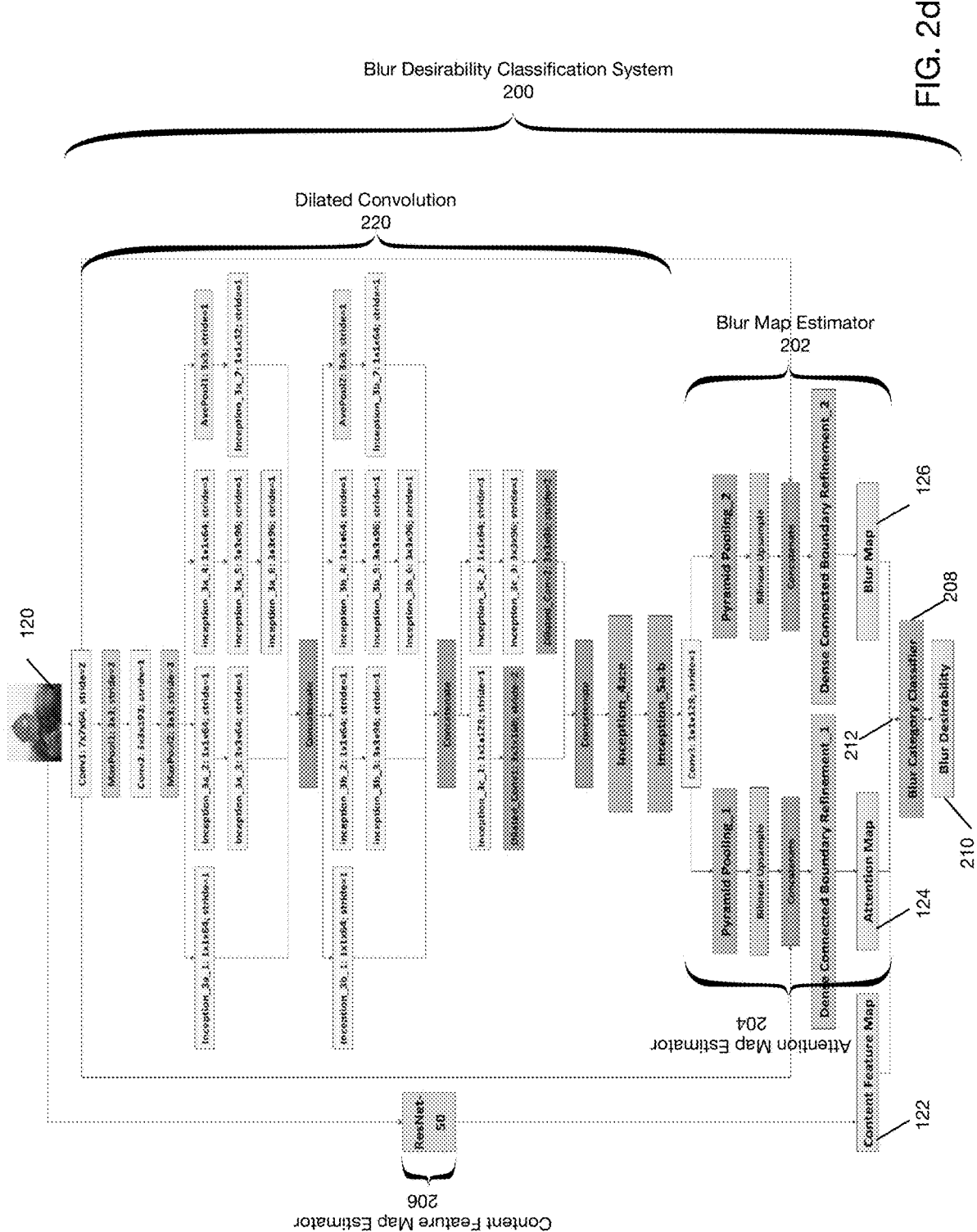
FIG. 2d shows a detailed block diagram of a deep neural network (DNN) referred to herein as ABC-FuseNet which jointly learns an attention map (A), blur map (B), and content feature map (C), and fuses them together to detect if there is blur on important content and estimate the blur desirability, according to one embodiment of the present disclosure.

FIG. 2c is a detailed block diagram of an attention map estimator according to one embodiment of the present disclosure. The structure shown in FIG. 2c is similar to that of the blur map estimator 202 shown in FIG. 2b. In particular, as shown in FIG. 2c, attention map estimator 204 comprises pyramid pooling block 230, bilinear up-sample block 232, concatenate block 234, and dense connected boundary refinement block 236. The output of dilated convolution block 220 is provided to pyramid pooling block 230, which generates an output that is provided to bilinear up-sample block 232. The output of bilinear up-sample block 232 is provided to concatenate block 234, which generates an output that is provided to dense connected boundary refinement block 236. Dense connected boundary refinement block 236 then generates attention map 124 as output.

FIG. 2d shows a detailed block diagram of the ABC-FuseNet, which may function as a blur classification system according to one embodiment of the present disclosure. As shown in FIG. 2d, ABCFuseNet processes image 120 using dilated convolution block 120, attention map estimator 204, blur map estimator 202, content feature map estimator 206 and blur category classifier 212 to ultimately generate blur type 210.

Blur Desirability Classification

Figure 2E:
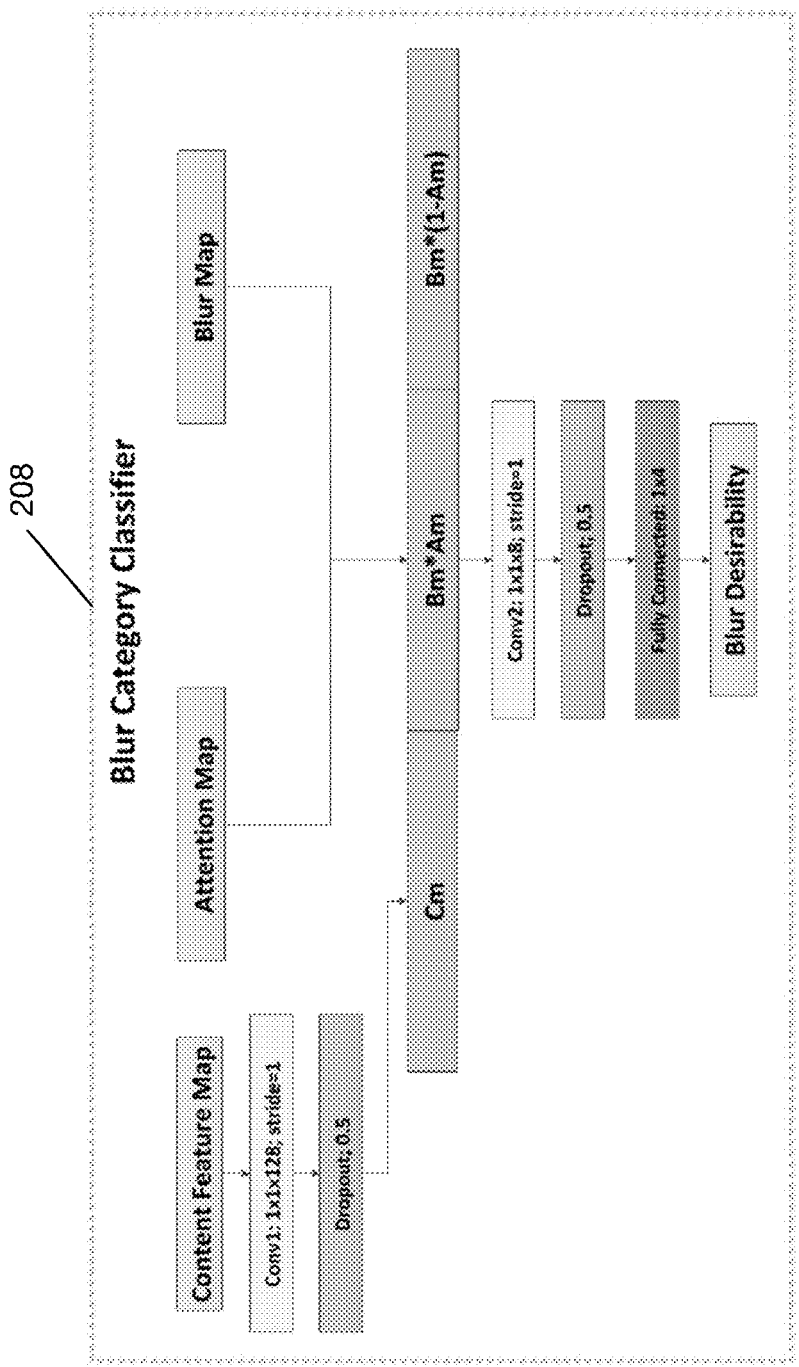
FIG. 2e shows a detailed block diagram of a blur category classifier of FIG. 2d, according to one embodiment of the present disclosure.

FIG. 2e shows a detailed block diagram of a blur category classifier of FIG. 2d, according to one embodiment of the present disclosure. Image blur classification according to some embodiments of the present disclosure relies on both low-level visual features to estimate a blur responses map and high-level understanding of the image content and user intent. In order to address the issue of image content and user intent, according to one embodiment of the present disclosure, a content feature map is learned to facilitate blur desirability classification. Specifically, according to one such embodiment as shown in FIG. 2d, a semantic feature map classifier from res5c of ResNet-50 with pre-trained weights is utilized as content feature map estimator 206. To understand if blur is present in the important content in the image, an attention map 124 is estimated simultaneously with the blur map 122 to adaptively localize the important content. According to one such embodiment, and as shown in FIG. 2d, the attention map estimation shares the first several layers (until Inception_5b) with blur map estimation, and then the flow diverges into two separate branches starting with the pyramid pooling module. In addition, the attention map branch is pre-trained with salient object segmentation datasets to obtain the initial weights. After learning the blur map $(B_m)$ 122, attention map $(A_m)$ 124, and content feature map $(C_m)$ 126, these three maps are fused together and provided as input to a light classifier 208 to estimate the image blur category.

According to one embodiment of the present disclosure, a dual attention mechanism is employed to extensively exploit the blur responses and high-level semantics when concatenating these three maps together. In particular, according to one such embodiment, $B_m x A_m$ $B_m x (1 - A_m)$ $C_m$ are stacked in the channel direction to form the final input to the blur category classifier 208, which contains two convolution layers, two dropout layers, and one fully connected layer, according to some embodiments. The ABC-FuseNet is end-to-end trainable, in which blur map estimation and blur desirability classification are jointly trained with both supervisions.

For the blur map estimation, a sigmoid function is applied at the last layer output of blur map estimator 202. During training, the L2 loss between the estimated blur map 122 and the ground truth blur map is calculated. As the blur amount for each pixel is annotated with four different levels in the Smart-Blur dataset (described below), these amounts are normalized into 0, ⅓, ⅔ and 1 respectively. According to one such embodiment, the following loss function is applied to perform the blur map estimation:

$$L_{B_m} = \frac{1}{2N} \sum_{i=1}^{N} \sum_{p=1}^{P} \left\| \frac{1}{1+\exp(-b_i(p;\theta))} - b_i^0(p) \right\|_2^2$$

where $b_i(p, \theta)$ is the estimated blur amount for pixel p in image i and $\theta$ indicates the parameters of the blur map estimator 202. $b_i^0(p)$ is the ground truth blur amount for pixel p in image i.

For the image blur desirability classification, each blur category label is converted into a one-hot vector to generate the ground truth supervision of each training image. The loss of the classification $L_{B_c}$ is computed by the softmax cross-entropy loss. According to one such embodiment, there is no supervision for the attention map estimation. In particular, the attention region in each image is estimated by weakly supervised learning from the image blur category. To this end, the total loss of the ABC-FuseNet is:

$$L = L_{B_m} + \lambda L_{B_c}$$

SmartBlur Dataset

To train and evaluate an ABC-FuseNet (such as shown in FIGS. 2a and 2d) to operate as a blur classification system 200, a large-scale dataset with both pixel-level blur amount and image-level blur desirability annotations is required. However, existing datasets only contain a limited number of images with coarsely-annotated blur amount, and no annotations on blur desirability. Thus, according to one embodiment of the present disclosure, a new dataset referred to herein as SmartBlur, which contains 10,000 natural photos with elaborate human annotations of both pixel-level blur amount and image-level blur desirability, was used to supervise the blur map estimation and blur desirability classification.

The SmartBlur dataset provides a reliable training and evaluation platform for blur analysis and can serve as a versatile benchmark for various tasks such as blur magnification and image deblur. About 10,000 images from publicly available sources were selected for annotation. When selecting these 10,000 photos, the number of images of different image blur desirability levels were balanced: GoodBlur, OkBlur, BadBlur and NoBlur (if there is no blur in the image). Photos with different blur types were also included such as object motion, camera shake, and out-of-focus. These 10,000 images were captured by various camera models in different shooting conditions covering different scenes. Image resolution ranges from 500×300 to 1024×720. For each image in the SmartBlur dataset, two levels of annotations were generated: pixel-level blur amount and image-level blur desirability.

Figures 3A, 3B:
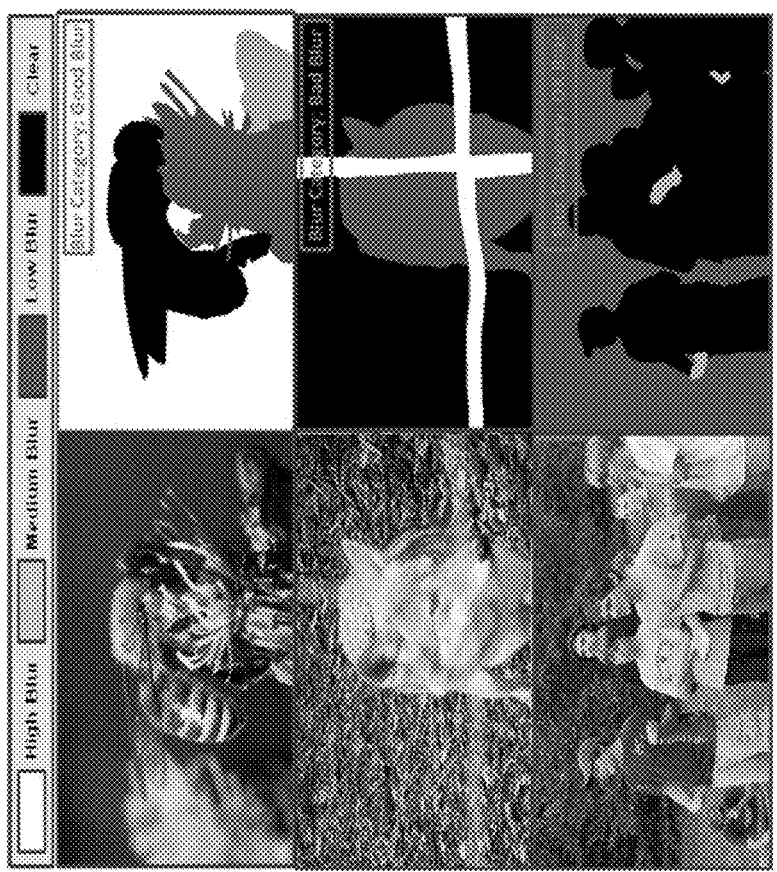
FIG. 3a shows blur annotations broken down into training, validation, testing sets, according to one embodiment of the present disclosure.
FIG. 3b shows annotation samples of each category of a dataset referred to herein as SmartBlur, according to one embodiment of the present disclosure.

FIG. 3a shows blur annotations broken down into training, test, and validation sets, according to one embodiment of the present disclosure. Each image was labeled by 3 annotators. As shown in FIG. 3a, for pixel-level blur amount annotation, each region in the image is labeled with four different blur amount categories: BadBlur, OkBlur, GoodBlur, and NoBlur. As shown in FIG. 3a, the SmartBlur dataset includes 1,822 NoBlur images, 1,968 BadBlur images, 1,983 OkBlur images, and 4,177 GoodBlur images for 10,000 images in total. The dataset was randomly split into three portions: training, validation, and testing. For evaluation and validation, the same number of images were randomly selected from each blur type to balance the data of different categories. Compared with existing datasets, the SmartBlur dataset has pixel level blur amount annotations with multiple levels, from low, medium to high. Further, it incorporates image level blur desirability annotation in terms of image quality.

According to one embodiment of the present disclosure, the boundary of each region in the image is annotated based on the blur amount, instead of object semantics. For image-level blur desirability annotation, each image is labeled with four categories: GoodBlur, OkBlur, BadBlur, or NoBlur. GoodBlur in an image indicates the blur is manipulated by photographers to create visually pleasing effects. The blur in GoodBlur images often appears on the background or unimportant objects. OkBlur indicates the blur is on some small or unimportant regions, or with negligible small amount. Such blur is not created intentionally and is usually generated due to imperfect capture conditions or limited expertise of the photographer. BadBlur indicates non-negligible blur on the important objects. Such blur is not desirable and significantly degrade the image quality. NoBlur indicates the entire image is sharp, with no discernible blur in it.

FIG. 3b shows annotation samples of each category of the SmartBlur dataset, according to one embodiment of the present disclosure. Specifically, annotation samples are shown for each of the GoodBlur (top), BadBlur (middle), and OkBlur (bottom) categories.

Training

According to one embodiment of the present disclosure, blur map estimator 202 and attention map estimator 204 are pre-trained with a salient object segmentation dataset to obtain the initial weights. Afterwards, blur map estimator 202 was trained with the SmartBlur dataset. The loss function was optimized via batch-based Adam and backpropagation. According to one such embodiment, the hyperparameters, including initial learning rate, weight decay penalty multiplier, and dropout rate were selected by cross-validation, and set to 0.001, 0.05, and 0.5 respectively. The batch size was set to 2 images for training.

Experimental Results Overview

Performance was tested on two datasets: CUHK and SmartBlur. Detailed results are described below. After obtaining the initial weights of blur map and attention map estimation branches, the network was jointly trained with both blur map supervision and blur desirability supervision. The hyperparameters, including the coefficient of blur type classification loss), initial learning rate, weight decay penalty multiplier, and dropout rate were selected by cross-validation, and are set to be 0.1, 0.01 and 0.5, respectively. The batch size was set to 4 images for training. To improve the generalization and robustness of the network, various data augmentation techniques were applied to the training processes including: horizontal flip, random crop, random brightness, and random contrast.

Experimental Results CUHK Dataset

The CUHK dataset contains 1000 images with human labeled blur regions, among which 296 images are partially motion-blur and 704 images are defocus-blur. As most of the existing blur detection methods are not learning-based and therefore do not have training images from CUHK, for a fare comparison with the baselines, ABC-FuseNet as provided herein was trained on the SmartBlur dataset. Then, the trained model was tested on the 1000 images of the CUHK dataset, without finetuning on the CUHK dataset at all. Such treatment guarantees that the techniques described herein are evaluated on the same amount of testing set as the baseline methodologies.

Figure 4A:
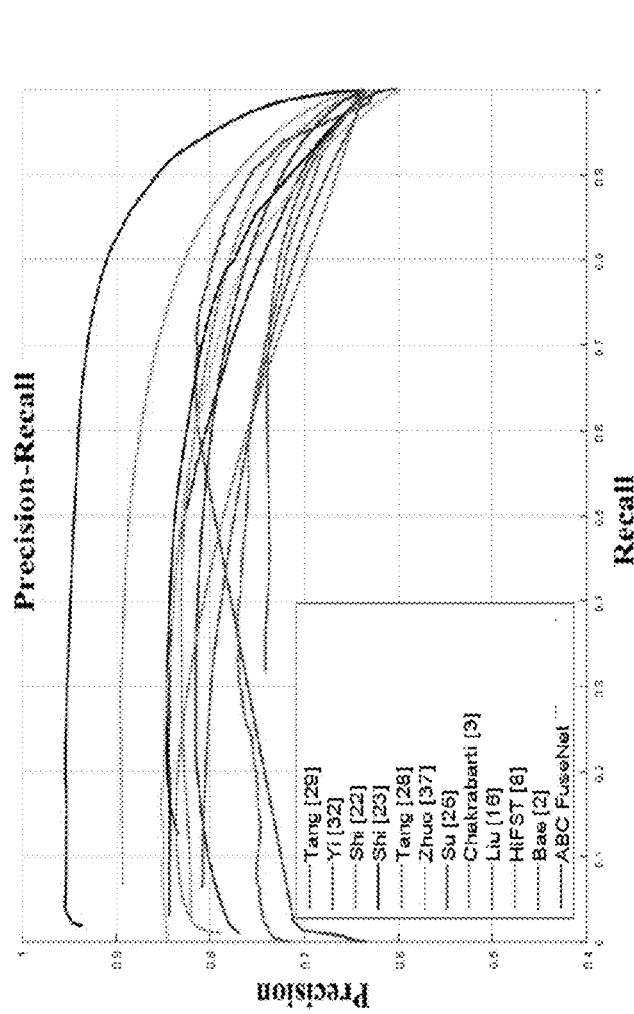
FIG. 4a shows a comparison of precision-recall curves tested on 1000 blur images, including both motion blur and defocus blur, with one curve according to one embodiment of the present disclosure.
Figure 4B:
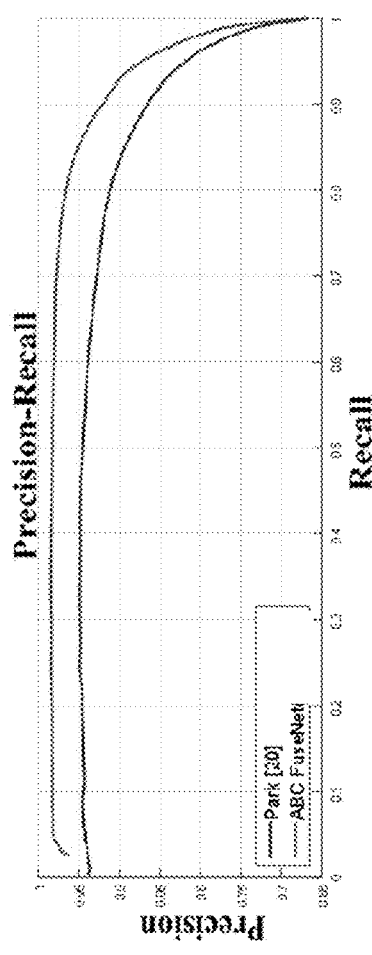
FIG. 4b shows a comparison of precision-recall curves tested on 704 defocus blur images, with one curve according to one embodiment of the present disclosure.

FIGS. 4a and 4b show the quantitative Precision-Recall comparison on CUHK for different methodologies, including one (ABC-FuseNet) according to one embodiment of the present disclosure. In particular, FIG. 4a shows a precision-recall curve tested on 1000 blur images, including both motion blur and defocus blur. FIG. 4b shows a comparison of precision-recall curves tested on 704 defocus blur images with one curve according to one embodiment of the present disclosure. From the comparisons shown in FIGS. 4a-b, it is apparent for the performance tested on the 1000 images with different blur sources, that ABC-FuseNet consistently outperforms all the state-of-the-art baseline methodologies by a large margin, which verifies its efficacy in detecting blur from different levels and sources. For the results tested on 704 defocus blur images, ABC-FuseNet also significantly outperforms baseline methods.

Figure 4C:
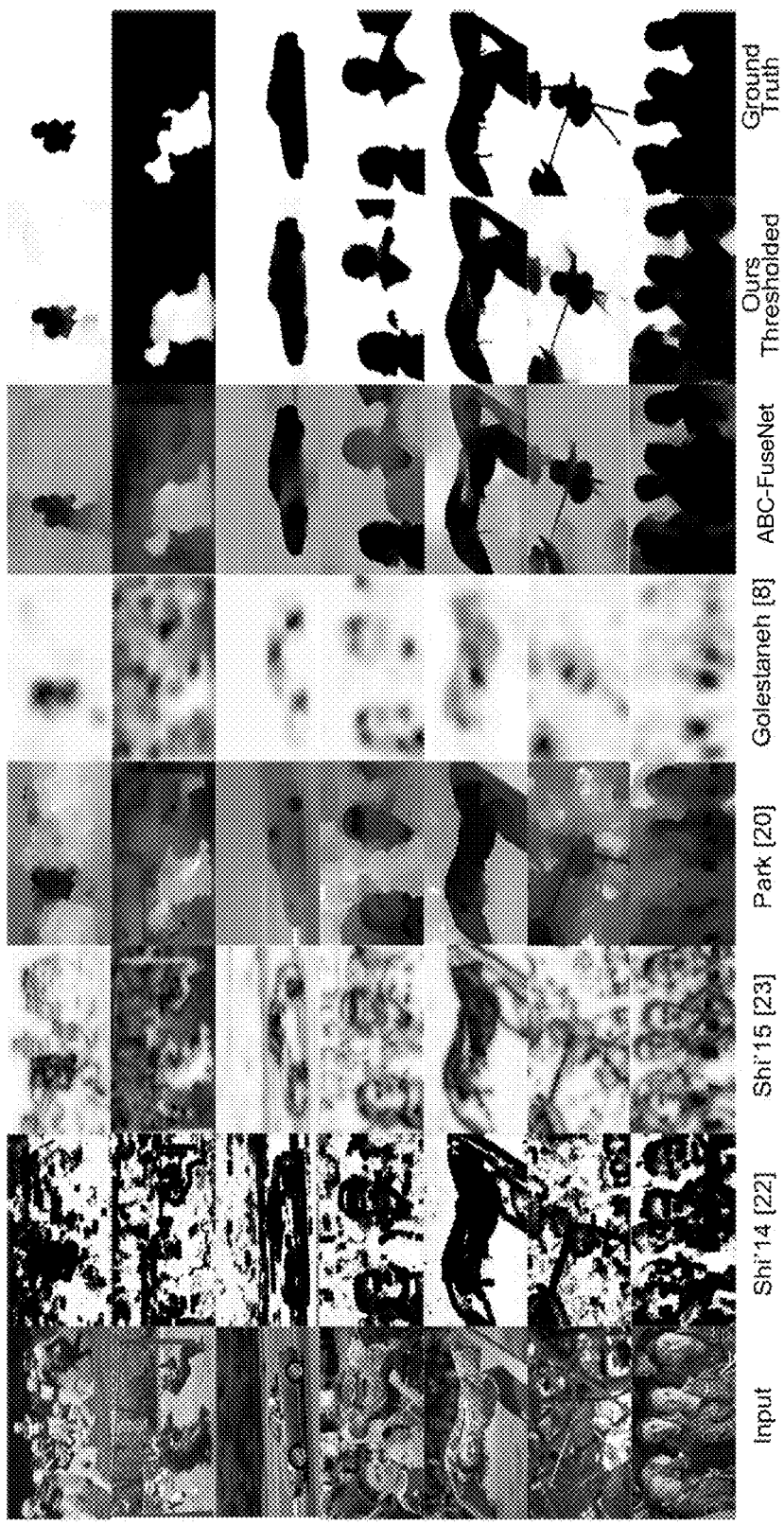
FIG. 4c shows visual results of some challenging images in a dataset referred to as CUHK, with respect to various blur classification methodologies, two of which are according to embodiments of the present disclosure.

FIG. 4c shows visual results of some challenging images in a dataset referred to as CUHK, with respect to various blur classification methodologies, two of which are according to embodiments of the present disclosure. As can be seen, the estimated blur maps of ABC-FuseNet are the most accurate and closest to the ground truth.

Experimental Results SmartBlur Dataset

As previously described SmartBlur is a large-scale blur image dataset containing about 10,000 blur images from different blur sources and blur levels, with the annotations of both pixel-level blur amount and image-level blur type. For images of training, validation, and testing sets, the dataset split shown in FIG. 3a was followed. According to one embodiment of the present disclosure, the experiments on SmartBlur dataset including two tasks: blur map estimation and image blur type classification.

Experimental Results for BlurMap Estimation

A comparison of blur map estimation with state-of-the-art-baseline methodologies will now be described. For quantitative comparison, the average precision (AP) computed by averaging the precision over all recall levels was utilized. As most of the baseline methodologies are designed for blur existence estimation (without estimating blur severity), for a fair comparison, a ground truth blur map was binarized and the precision-recall was computed by varying the threshold within the range [0,255] for all the methods.

Figure 4D:
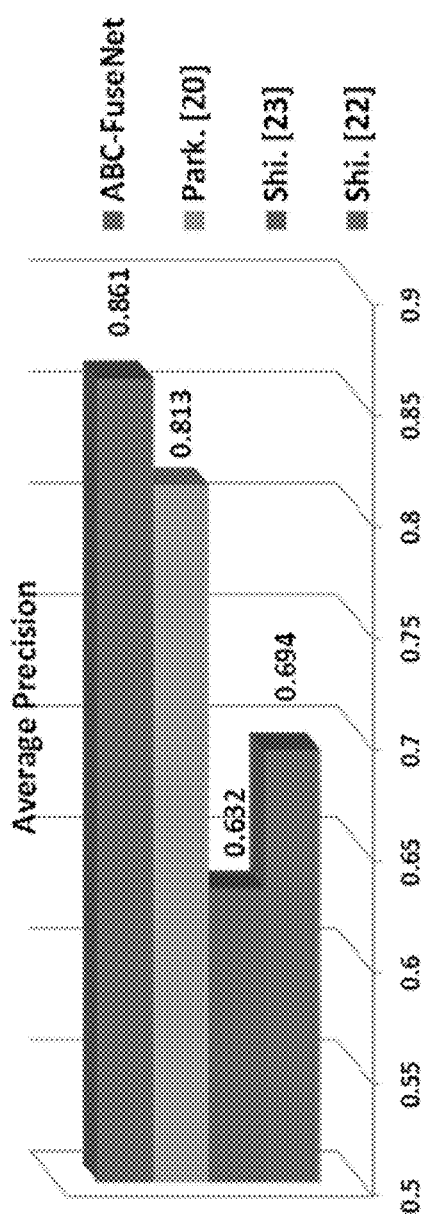
FIG. 4d shows a comparison of average precision for blur map estimation performed by baseline methodologies and a method (ABC-FuseNet) according to one embodiment of the present disclosure

FIG. 4d shows a comparison of average precision for blur map estimation performed by ABC-FuseNet compared with baseline methods, according to one embodiment of the present disclosure. As shown in FIG. 4d, ABC-FuseNet outperforms all the baseline methods with a large margin, verifying the efficacy of ABC-FuseNet to detect blurs from different levels and sources.

Figure 4E:
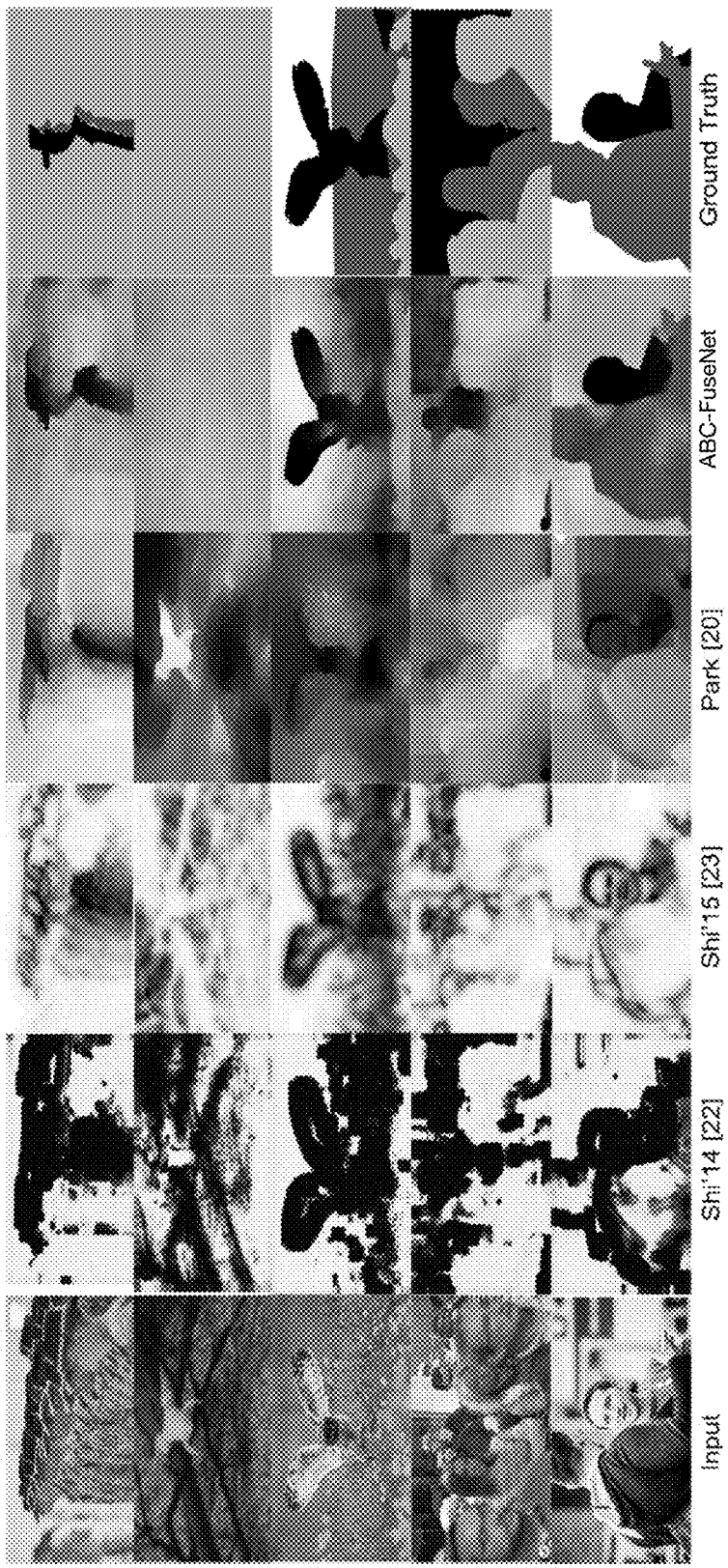
FIG. 4e shows a comparison of visual results of blur classification methodologies employed on challenging images in the SmartBlur dataset, including baseline methods and a method (ABC-FuseNet) according to one embodiment of the present disclosure.

FIG. 4e shows some visual results of challenging images in the SmartBlur dataset for ABC-FuseNet as compared with baseline methods, according to one embodiment of the present disclosure. The images shown in FIG. 4e have blurs from different sources (defocus, camera shake, or object motion) and amounts (low, medium, or high). The results further demonstrate that ABC-FuseNet can produce high-quality blur maps 122 with accurate boundaries. Furthermore, ABC-FuseNet can estimate different blur amounts that are consistent with ground-truth annotations (third row). An interesting observation is that for the image blur from camera shake (second row), all the baseline methodologies fail to detect the uniform blur over the whole image. Some baseline methodologies tend to output high responses based on the object features, instead of blur amount. Other baseline methodologies mistakenly estimate the whole image as a clear one. By contrast, ABC-FuseNet is robust to different blur sources and can detect the uniform camera-shake blurs over the whole image.

Experimental Results for Image Blur Classification

Figure 4F:
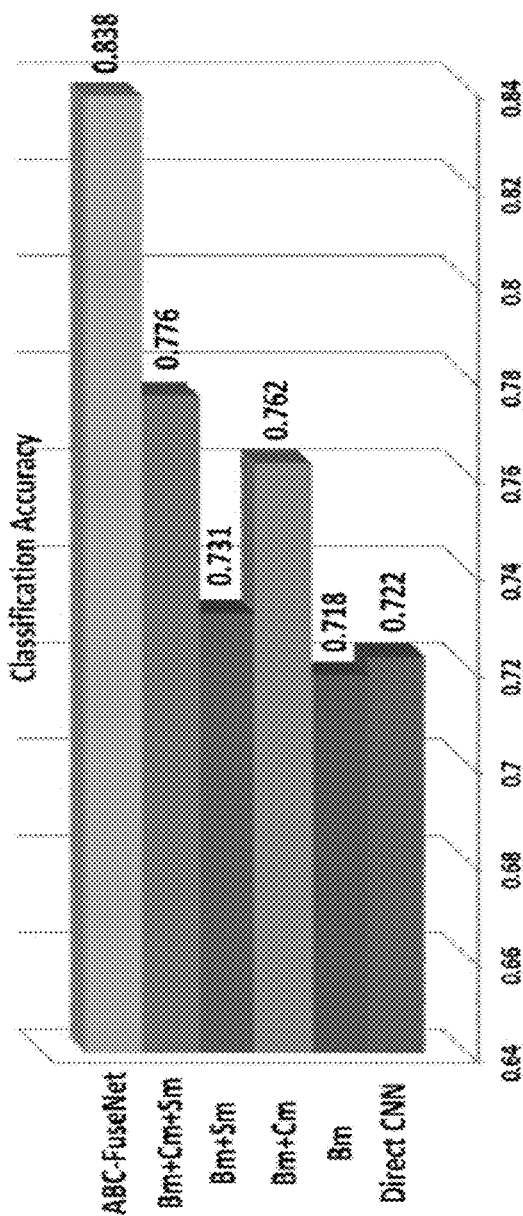
FIG. 4f shows classification accuracy of method (ABC-FuseNet) according to an embodiment compared with baseline methodologies with respect to image blur classification.

FIG. 4f shows classification accuracy of ABC-FuseNet compared with baselines with respect to image blur classification according to one embodiment of the present disclosure. As shown in FIG. 4f, ABC-FuseNet achieves the accuracy of 0.838 outperforming all the baselines by a large margin.

Figure 4G:
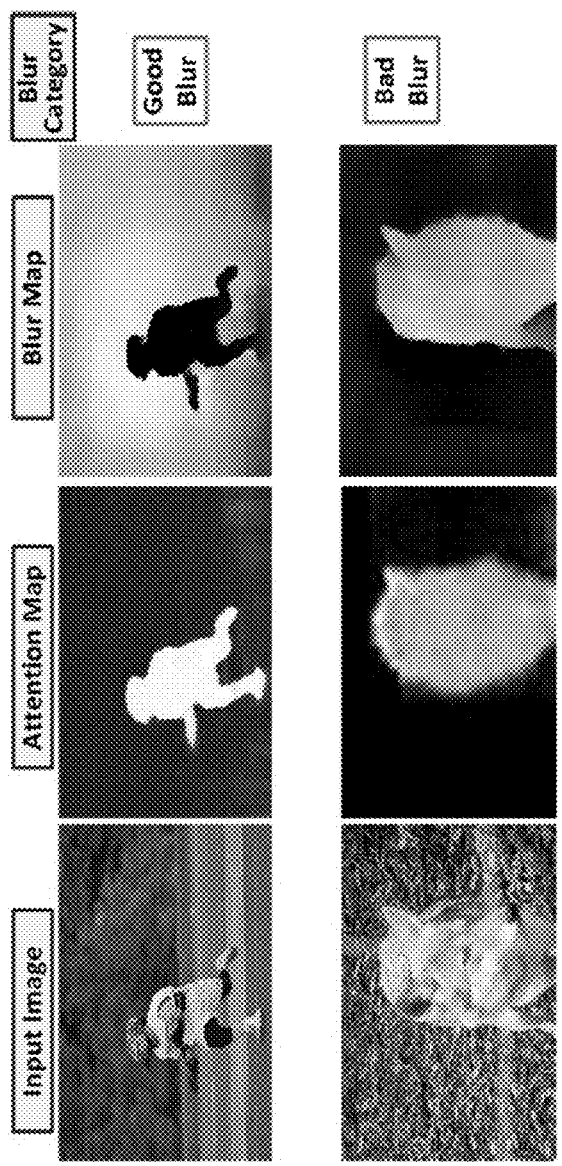
FIG. 4g shows a visualization of estimated blur map, attention map, and classification results for image blur classification according to one embodiment of the present disclosure.

FIG. 4g shows a visualization of estimated blur map, attention map, and classification results for image blur classification, according to one embodiment of the present disclosure.

Integration in Computing System and Network Environment

FIG. 5a illustrates an example computing system that executes blur desirability classification system 200 according to one embodiment of the present disclosure. As depicted in FIG. 5a, computing device 500 may include CPU 504 that executes one or more processes to perform Structured Transcription System 300. In particular, CPU 504 may be further configured via programmatic instructions to execute Structured Transcription System 300 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 can be any stand-alone computing platform, such as a desk top or work station computer, laptop computer, tablet computer, smart phone or personal digital assistant, game console, set-top box, or other suitable computing platform.

Figure 5B:
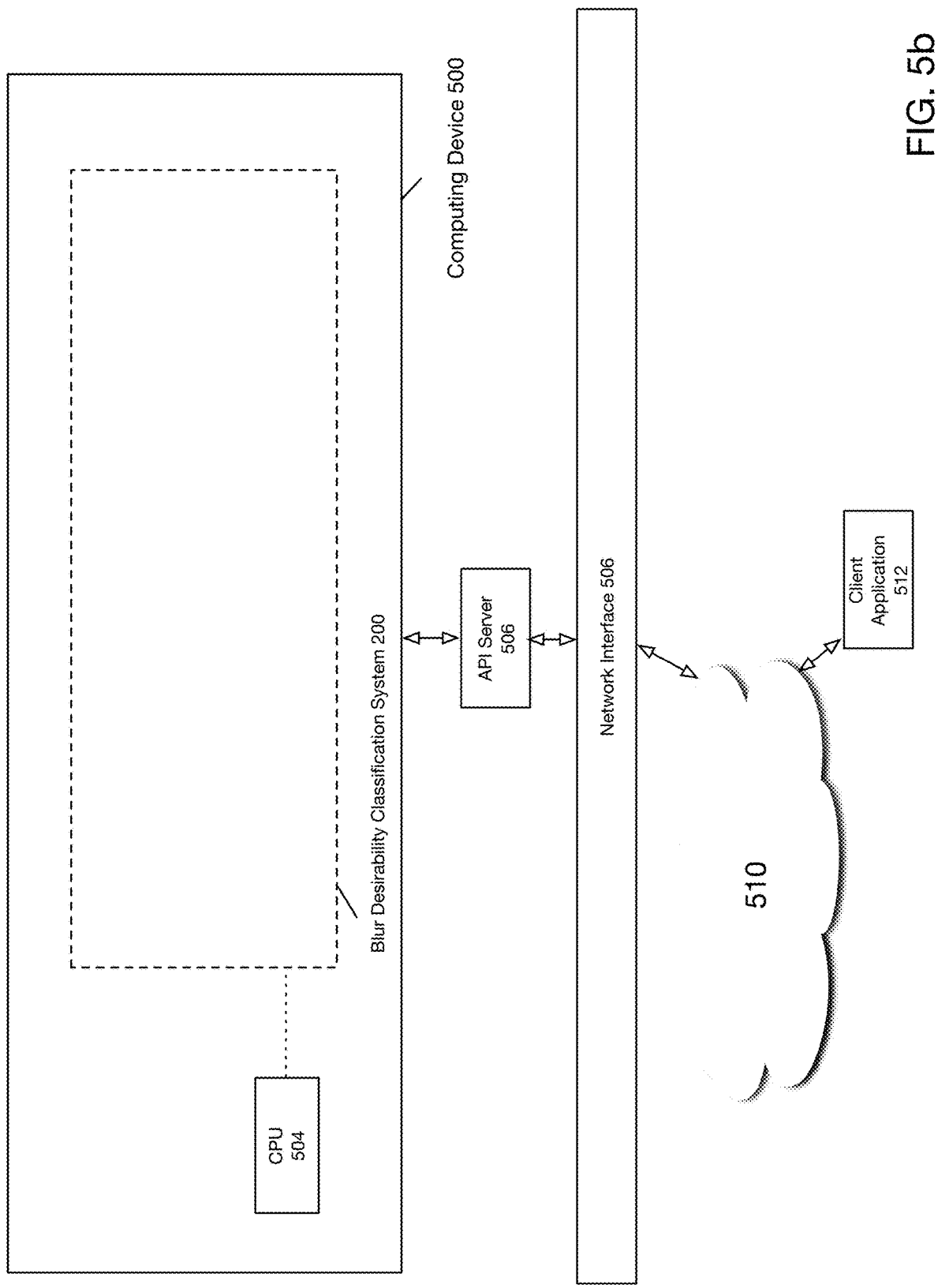
FIG. 5b illustrates an example integration of a blur desirability classification system into a network environment, according to one embodiment of the present disclosure.

FIG. 5b illustrates an example integration of a blur desirability classification system 200 into a network environment according to one embodiment of the present disclosure. As depicted in FIG. 5b, computing device 500 may be collocated in a cloud environment, data center, local area network ("LAN") etc. Computing device 500 shown in FIG. 5b is structured identically to the example embodiment described with respect to FIG. 5a. As shown in FIG. 5b, client application 512 may interact with computing device 500 via network 510. In particular, client application 512 may make requests and receive responses via API calls received at API server 506, which are transmitted via network 510 and network interface 508.

It will be understood that network 510 may comprise any type of public or private network including the Internet or LAN. It will be further readily understood that network 510 may comprise any type of public and/or private network including the Internet, LANs, WAN, or some combination of such networks. In this example case, computing device 500 is a server computer, and client application 512 may be any typical personal computing platform As will be further appreciated, computing device 500, whether the one shown in FIG. 5a or 65, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of desirability classification system 200 or ABC-FuseNet, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for classifying blur in an image comprising processing an image to generate a blur map ($B_m$), a content feature map ($C_m$), and an attention map ($A_m$), combining said blur map, said content feature map, and said attention map to generate a composite map, and performing classification on said composite map to generate a blur type classification.

Examples 2 is the method according to Example 1, wherein said composite map comprises a stack of $B_m \times A_m$, $B_m \times (1-A_m)$ and $C_m$.

Example 3 is the method according to Example 1 or Example 2, wherein said blur type classification is one of the classifications GOOD BLUR, OK BLUR, BAD BLUR, and NO BLUR.

Example 4 is the method according to any of Examples 1-3, wherein said content feature map is generated using a ResNet model.

Example 5 is the method according to any of Examples 1-4, wherein said blur map is generated by performing a dilated convolution operation, a pyramid pooling operation, a bilinear up-sampling operation, and a dense connected boundary refinement operation.

Example 6 is the method according to any of Examples 1-5, wherein said attention map is generated by performing a dilated convolution operation, a pyramid pooling operation, a bilinear up-sampling operation, and a dense connected boundary refinement operation.

Example 7 is the method according to any of Examples 1-6, further comprising performing a joint training of a blur map estimator, an attention estimator block, and a content feature map estimator block.

Example 8 is a system for classifying blur in an image, the system comprising a dilated convolution block, said dilated convolution block to perform a dilated convolution on an image, a blur map estimator block coupled to an output of said dilated convolution block, said blur map estimator block to generate a blur map, an attention estimator block coupled to an output of said dilated convolution block, said attention map estimator block to generate an attention map, a content feature map estimator block, said content feature map estimator block to generate a content feature map based upon said image, a combiner, said combiner to generate a composite map from said blur map, said attention map, and said content feature map, and, a blur category classifier coupled to an output of said combiner, said blur category classifier to generate a blur type classification based upon said composite map.

Example 9 is the system according to Example 8, wherein said composite map comprises a stack of $B_m \times A_m$, $B_m \times (1-A_m)$ and $C_m$.

Example 10 is the system according to any of Examples 8-9, wherein said blur type classification is one of GOOD BLUR, OK BLUR, BAD BLUR, and NO BLUR.

Example 11 is the system according to any of Examples 8-10, wherein said content feature map estimator block is a ResNet model.

Example 12 is the system according to any of Examples 8-11, wherein each of said blur map estimator and said attention map estimator comprises a dilated convolution block, a pyramid pooling block, a bilinear up-sampling block, and a dense connected boundary refinement block.

Example 13 is the system according to any of Examples 8-12, further comprising a training block to jointly train said blur map estimator, said attention estimator block, and said content feature map estimator block.

Example 14 is a computer program product including one or more non-transitory machine-readable mediums encoded with instructions that when executed by one or more processors cause a process to be carried out for classifying blur in an image, the process comprising processing an image to generate a blur map ($B_m$), a content feature map ($C_m$), and an attention map ($A_m$), combining said blur map, said content feature map, and said attention map to generate a composite map, and performing classification on said composite map to generate a blur type classification.

Example 15 is the computer program product according to Example 14, wherein said composite map comprises a stack of $B_m \times A_m$, $B_m \times (1-A_m)$ and $C_m$.

Example 16 is the computer program product according to any of Examples 14-15, wherein said blur type classification is one of the classifications GOOD BLUR, OK BLUR, BAD BLUR, and NO BLUR.

Example 17 is the computer program product according to any of Examples 14-16, wherein said content feature map is generated using a ResNet model.

Example 18 is the computer program product according to any of Examples 14-17, wherein said blur map is generated by performing a dilated convolution operation, a pyramid pooling operation, a bilinear up-sampling operation, and a dense connected boundary refinement operation.

Example 19 is the computer program product according to any of Examples 14-18, wherein said attention map is generated by performing a dilated convolution operation, a pyramid pooling operation, a bilinear up-sampling operation and a dense connected boundary refinement operation.

Example 20 is the computer program product according to any of Examples 14-19, the process further comprising jointly training a blur map estimator, an attention estimator block, and a content feature map estimator block.

What is claimed is:

1. A method for classifying blur in an image comprising:
   processing an image to generate a blur map ($B_m$), a content feature map ($C_m$), and an attention map ($A_m$);
   combining said blur map, said content feature map, and said attention map to generate a composite map; and,
   performing classification on said composite map to generate a blur type classification.

2. The method according to claim 1, wherein said composite map comprises a stack of $B_m \times A_m$, $B_m \times (1-A_m)$ and $C_m$.

3. The method according to claim 1, wherein said blur type classification is one of the classifications GOOD BLUR, OK BLUR, BAD BLUR, and NO BLUR.

4. The method according to claim 1, wherein said content feature map is generated using a ResNet model.

5. The method according to claim 1, wherein said blur map is generated by performing a dilated convolution operation, a pyramid pooling operation, a bilinear up-sampling operation, and a dense connected boundary refinement operation.

6. The method according to claim 1, wherein said attention map is generated by performing a dilated convolution operation, a pyramid pooling operation, a bilinear up-sampling operation, and a dense connected boundary refinement operation.

7. The method according to claim 6, further comprising performing a joint training of a blur map estimator, an attention estimator block, and a content feature map estimator block.

8. A system for classifying blur in an image, the system comprising:
   a dilated convolution block, said dilated convolution block to perform a dilated convolution on an image;
   a blur map estimator block coupled to an output of said dilated convolution block, said blur map estimator block to generate a blur map;
   an attention estimator block coupled to an output of said dilated convolution block, said attention map estimator block to generate an attention map;
   a content feature map estimator block, said content feature map estimator block to generate a content feature map based upon said image;
   a combiner, said combiner to generate a composite map from said blur map, said attention map, and said content feature map; and,
   a blur category classifier coupled to an output of said combiner, said blur category classifier to generate a blur type classification based upon said composite map.

9. The system according to claim 8, wherein said composite map comprises a stack of $B_m \times A_m$, $B_m \times (1-A_m)$ and $C_m$.

10. The system according to claim 8, wherein said blur type classification is one of GOOD BLUR, OK BLUR, BAD BLUR, and NO BLUR.

11. The system according to claim 8, wherein said content feature map estimator block is a ResNet model.

12. The system according to claim 8, wherein each of said blur map estimator and said attention map estimator comprises a dilated convolution block, a pyramid pooling block, a bilinear up-sampling block, and a dense connected boundary refinement block.

13. The system according to claim 8, further comprising a training block to jointly train said blur map estimator, said attention estimator block, and said content feature map estimator block.

14. A computer program product including one or more non-transitory machine-readable mediums encoded with instructions that when executed by one or more processors cause a process to be carried out for classifying blur in an image, the process comprising:
   processing an image to generate a blur map ($B_m$), a content feature map ($C_m$), and an attention map ($A_m$);
   combining said blur map, said content feature map, and said attention map to generate a composite map; and,
   performing classification on said composite map to generate a blur type classification.

15. The computer program product according to claim 14, wherein said composite map comprises a stack of $B_m \times A_m$, $B_m \times (1-A_m)$ and $C_m$.

16. The computer program product according to claim 14, wherein said blur type classification is one of the classifications GOOD BLUR, OK BLUR, BAD BLUR, and NO BLUR.

17. The computer program product according to claim 14, wherein said content feature map is generated using a ResNet model.

18. The computer program product according to claim 14, wherein said blur map is generated by performing a dilated convolution operation, a pyramid pooling operation, a bilinear up-sampling operation, and a dense connected boundary refinement operation.

19. The computer program product according to claim 14, wherein said attention map is generated by performing a dilated convolution operation, a pyramid pooling operation, a bilinear up-sampling operation and a dense connected boundary refinement operation.

20. The computer program product according to claim 14, the process further comprising jointly training a blur map estimator, an attention estimator block, and a content feature map estimator block.

* * * * *